(12) United States Patent
Sohn et al.

(10) Patent No.: US 7,605,988 B2
(45) Date of Patent: Oct. 20, 2009

(54) COMPACT IMAGE TAKING LENS SYSTEM WITH A LENS-SURFACED PRISM

(75) Inventors: Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 87 days.

(21) Appl. No.: 11/781,907

(22) Filed: Jul. 23, 2007

(65) Prior Publication Data
US 2009/0027780 A1 Jan. 29, 2009

(51) Int. Cl.
G02B 17/00 (2006.01)
G02B 3/00 (2006.01)

(52) U.S. Cl. ...................... 359/726; 359/737
(58) Field of Classification Search ................. 359/726, 359/728, 737, 784, 833, 851
See application file for complete search history.

(56) References Cited

U.S. PATENT DOCUMENTS

| | | | |
|---|---|---|---|
| 2,002,376 A | 5/1935 | Mannheimer |
| 4,407,567 A | 10/1983 | Michelet |
| 4,834,512 A | 5/1989 | Austin |
| 4,853,787 A | 8/1989 | Kurth |
| 4,944,580 A | 7/1990 | MacDonald |
| 5,004,319 A | 4/1991 | Smither |
| 5,172,235 A | 12/1992 | Wilm |
| 5,212,555 A | 5/1993 | Stoltz |
| 5,369,433 A | 11/1994 | Baldwin |
| 5,402,407 A | 3/1995 | Eguchi |
| 5,467,121 A | 11/1995 | Allcock |
| 5,612,736 A | 3/1997 | Vogeley |
| 5,661,518 A | 8/1997 | Palm |
| 5,696,619 A | 12/1997 | Knipe |
| 5,748,199 A | 5/1998 | Palm |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michalicek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,233,087 B1 | 5/2001 | Hawkins |
| 6,282,213 B1 | 8/2001 | Gutin |
| 6,304,263 B1 | 10/2001 | Chiabrera |
| 6,315,423 B1 | 11/2001 | Yu |
| 6,329,737 B1 | 12/2001 | Jerman |
| 6,329,963 B1 | 12/2001 | Chiabera |
| 6,421,081 B1 | 7/2002 | Markus |
| 6,438,272 B1 | 8/2002 | Huang |
| 6,498,673 B1 | 12/2002 | Frigo |

(Continued)

Primary Examiner—Alicia M Harrington

(57) ABSTRACT

A compact image taking lens system with a lens-surfaced prism of the present invention comprises a prism, an aperture stop, a first lens element, a second lens element, reflecting mirror surface, and image surface, optionally an infrared cut-off filter. By introducing a lens-surfaced prism, the compact image taking lens system with a lens-surfaced prism of the present invention has many advantages over the prior arts in the field of invention, such as compactness in thickness, small number of optical elements, high performance of optical quality, enough space for optional elements such as an infrared cut-off filter and diversity in optical geometries.

28 Claims, 4 Drawing Sheets

U.S. PATENT DOCUMENTS

| | | |
|---|---|---|
| 6,507,366 B1 | 1/2003 | Lee |
| 6,549,730 B1 | 4/2003 | Hamada |
| 6,600,591 B2 | 7/2003 | Anderson |
| 6,611,343 B1 | 8/2003 | Frankowski |
| 6,618,209 B2 | 9/2003 | Nishioka |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,781,731 B2 | 8/2004 | Choi |
| 6,781,732 B2 | 8/2004 | Cho |
| 6,784,771 B1 | 8/2004 | Fan |
| 6,801,260 B1 | 10/2004 | Veksland |
| 6,804,429 B2 | 10/2004 | Yu |
| 6,833,938 B2 | 12/2004 | Nishioka |
| 6,836,459 B2 | 12/2004 | Komoto |
| 6,870,660 B2 | 3/2005 | DiCarlo |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,909,453 B2 | 6/2005 | Mochizuki |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,944,103 B2 | 9/2005 | Hong |
| 6,956,687 B2 | 10/2005 | Moon |
| 6,958,777 B1 | 10/2005 | Pine |
| 6,970,284 B1 | 11/2005 | Kim |
| 6,971,116 B2 | 11/2005 | Takeda |
| 6,985,299 B2 | 1/2006 | Bakin |
| 6,995,897 B2 | 2/2006 | Mushika |
| 6,995,909 B1 | 2/2006 | Hayashi |
| 6,999,226 B2 | 2/2006 | Kim |
| 7,009,561 B2 | 3/2006 | Menache |
| 7,019,376 B2 | 3/2006 | Patel |
| 7,023,466 B2 | 4/2006 | Favalora |
| 7,025,461 B2 | 4/2006 | Veligdan |
| 7,027,207 B2 | 4/2006 | Huibers |
| 7,031,046 B2 | 4/2006 | Kim |
| 7,046,447 B2 | 5/2006 | Raber |
| 7,057,826 B2 | 6/2006 | Cho |
| 7,068,415 B2 | 6/2006 | Mushika |
| 7,068,416 B2 | 6/2006 | Gim |
| 7,077,523 B2 | 7/2006 | Seo |
| 7,079,325 B2 * | 7/2006 | Konno ........................ 359/737 |
| 7,088,493 B2 | 8/2006 | Alain |
| 7,091,057 B2 | 8/2006 | Gan |
| 7,127,136 B2 | 10/2006 | Hall |
| 7,161,729 B2 | 1/2007 | Kim |
| 7,164,465 B2 | 1/2007 | Klosner |
| 7,173,653 B2 | 2/2007 | Gim |
| 7,184,192 B2 | 2/2007 | Sandstrom |
| 7,195,163 B2 | 3/2007 | Yoo |
| 7,209,286 B2 | 4/2007 | Mann |
| 7,212,330 B2 | 5/2007 | Seo |
| 7,215,882 B2 | 5/2007 | Cho |
| 7,239,438 B2 | 7/2007 | Cho |
| 7,245,325 B2 | 7/2007 | Yamaguchi |
| 7,245,363 B2 | 7/2007 | Mushika |
| 7,261,417 B2 | 8/2007 | Cho |
| 7,267,447 B2 | 9/2007 | Kim |
| 7,274,517 B2 | 9/2007 | Cho |
| 7,306,344 B2 | 12/2007 | Abu-Ageel |
| 7,315,503 B2 | 1/2008 | Cho |
| 7,333,260 B2 | 2/2008 | Cho |
| 7,339,746 B2 | 3/2008 | Kim |
| 7,354,167 B2 | 4/2008 | Cho |
| 7,355,627 B2 | 4/2008 | Yamazaki |
| 7,370,412 B2 | 5/2008 | Hiraoka |
| 7,436,599 B2 * | 10/2008 | Mihara et al. ............... 359/726 |
| 2003/0174234 A1 | 9/2003 | Kondo |
| 2004/0021802 A1 | 2/2004 | Yoshino |
| 2004/0184146 A1 | 9/2004 | Uehara |
| 2004/0207768 A1 | 10/2004 | Liu |
| 2005/0128604 A1 * | 6/2005 | Kuba ......................... 359/726 |
| 2005/0206773 A1 | 9/2005 | Kim |
| 2005/0207486 A1 | 9/2005 | Lee |
| 2005/0212856 A1 | 9/2005 | Temple |
| 2005/0259158 A1 | 11/2005 | Jacob |
| 2006/0007301 A1 | 1/2006 | Cho |
| 2006/0120706 A1 | 6/2006 | Cho |
| 2006/0146140 A1 | 7/2006 | Kennedy |
| 2006/0209439 A1 | 9/2006 | Cho |
| 2006/0256332 A1 | 11/2006 | Sandstrom |
| 2007/0263113 A1 | 11/2007 | Baek |

* cited by examiner

COMPACT IMAGE TAKING LENS SYSTEM WITH A LENS-SURFACED PRISM

FIELD OF INVENTION

The present invention relates to a compact lens with a small number of lens elements in general and more specifically to a compact lens for a small sized imaging taking devices.

BACKGROUND OF THE INVENTION

As the image sensor and optical technology progress, hand-held devices and small sized optical applications become popular. Further, with the development of higher performance cellular phones and portable cameras, small sized image modules and lens systems with high optical quality are currently under development. Especially, advances of image sensors in the field of miniaturization and highly dense pixels increase the need optical module or lens system with high resolution performance and more compactness. Due to the optical configuration and constraints, the size of hand-held devices has limitation to become smaller.

In response to such needs, a small number lens construction may be used in order to satisfy the requirements of compactness and low cost. Because of the constraint of small number of optical lenses, aspheric surface design becomes popularly spread in order to achieve higher performance.

In the present invention, by introducing a lens-surfaced prism, the size in thickness is considerably reduced while the optical path length of the lens system remains the same or longer. The compact image taking lens system with a lens-surfaced prism of the present invention has many advantages over the prior arts in the field of invention, such as compactness in thickness, small number of optical elements, higher performance of optical quality, enough space for optional elements such as infrared cut-off filter and diversity in optical geometry.

SUMMARY OF THE INVENTION

The main purpose of the present invention is to provide highly compact optical lens system to be applied to the hand-held devices and small optical applications. By introducing a lens-surfaced prism, the compact image taking lens system with a lens-surfaced prism of the present invention has many advantages and can be applied to various designs of the optical applications; especially thickness of the optical system can considerably be reduced.

The compact image taking lens system with a lens-surfaced prism of the present invention comprises a lens-surfaced prism, an aperture stop, a first lens element, a second lens element, a reflecting mirror surface, and an image surface, optionally an infrared cut-off filter. In a preferable configuration and embodiment, each component of the compact image taking lens system with a lens-surfaced prism of the present invention has the following property and geometry.

The lens-surfaced prism of the present invention has a concave surface on the object side, an internal reflective surface, and a surface on the image side. The lens-surfaced prism is made of plastic with at least one aspheric surface on the object side and the image side. Also the lens-surfaced prism can be made of glass with at least one aspheric surface on the object side and the image side.

The lens-surfaced prism has an internal reflection surface between the surfaces of the object side and the image side. The internal reflective surface of the lens-surfaced prism preferably makes a total internal reflection. Or the internal reflective surface of the lens-surfaced prism is a reflective surface made of internal reflective coating. This internal reflective coating of the lens-surfaced prism is made of metal or dielectric materials.

The compact image taking lens system with a lens-surfaced prism of the present invention comprises an aperture stop between the lens-surfaced prism and the first lens element to increase the optical performance of the system.

The first lens element of the present invention is preferably made of plastic with Abbe number less than 35.0. The first lens element can have at least one aspheric surface on the object side and on the image side. The first lens element has a meniscus shape with a convex surface on the object side. Also the first lens element can have both side aspheric surfaces on the object side and on the image side.

The second lens element of the present invention has at least one aspheric surface on the object side and on the image side. Also the second lens element has a meniscus shape with a convex surface on the object side. The second lens element has both side aspheric surfaces on the object side and on the image side. Preferably the second lens element is made of plastic with Abbe number larger than 45.0 or made of glass with Abbe number larger than 45.0.

The compact image taking lens system with a lens-surfaced prism of the present invention can further comprise of a reflecting surface between the second lens element and the image surface to reflect incident light to the image surface while reducing thickness of the image taking lens system. The compact image taking lens system with a lens-surfaced prism of the present invention can further comprise of an infrared cut-off filter between the second lens element and the image surface to enhance the image quality.

In another possible embodiment, the compact image taking lens system with a lens-surfaced prism of the present invention comprises a lens-surfaced prism having a concave surface on the object side, an internal reflective surface, and a surface on the image side, wherein both sides of the object side and the image sides are aspheric, an aperture stop, a first lens element is a negative optical refractive power meniscus shape lens with a convex on the object side, wherein the first lens element is made of plastic with at least one aspheric surface on the object side surface and the image side surface, a second lens element having a positive optical refractive power, a reflective surface to reduce thickness of the compact image taking lens system, and an image surface, wherein the image taking lens system makes an image on the image surface.

Preferably the lens-surfaced prism of the present invention is made of plastic or glass. The first lens element of the present invention has both side aspheric surfaces on the object side surface and on the image side surface. The second lens element of the present invention has at least one aspheric surface on the object side and on the image side surface with a convex on the object side surface. Alternatively, the second lens element has a meniscus shape with a convex on the object side.

Also the compact image taking lens system with a lens-surfaced prism of the present invention can further comprise of an infrared cut-off filter between the second lens element and the image surface.

In a last example of embodiment, the compact image taking lens system with a lens-surfaced prism of the present invention comprises of a lens-surfaced prism having a concave surface on the object side, an internal reflective surface, and a concave surface on the image side, an aperture stop, a first lens element, wherein the first lens element is a meniscus shape lens with a negative optical refractive power and a convex on the object side and wherein the first lens element is made of plastic with at least one aspheric surface on the object side surface and the image side surface, a second lens element having a positive optical refractive power with a convex on the object side, wherein the second lens element is made of plastic with Abbe number larger than 45.0, a reflective surface to reduce thickness of the compact image taking lens system, and an image surface, wherein the image taking lens system makes an image on the image surface. All the above elements are arranged in order from an object side to an image side.

The lens-surfaced prism of the compact image taking lens system of the present invention is made of glass with both side aspheric surfaces on the object side and the image side. The second lens element has at least one aspheric surface on the object side and on the image side surface with a convex on the object side surface. The second lens element can have a meniscus shape with a convex on the object side.

Also the compact image taking lens system with a lens-surfaced prism can further comprise of an infrared cut-off filter between the second lens element and the image surface.

DESCRIPTION OF FIGURES AND TABLES

The present invention will become more fully understood from the detailed description given below and the accompanying drawings and tables, which are given by way of illustration only and thus are not limitative of the present invention, wherein.

TABLE 1 shows detailed surface properties of compact image taking lens system with a lens-surfaced prism of the present invention according to the embodiment 1 in order from the object side;

TABLE 2 shows aspheric surface coefficients of compact image taking lens system with a lens-surfaced prism of the present invention according to the embodiment 1;

TABLE 3 shows detailed surface properties with conic coefficients of compact image taking lens system with a lens-surfaced prism of the present invention according to the embodiment 3 in order from the object side;

TABLE 4 shows detailed surface properties of compact image taking lens system with a lens-surfaced prism of the present invention according to the embodiment 4 in order from the object side;

TABLE 5 shows aspheric surface coefficients of compact image taking lens system with a lens-surfaced prism of the present invention according to the embodiment 4;

DETAILED DESCRIPTION OF THE INVENTION

Figure 1:
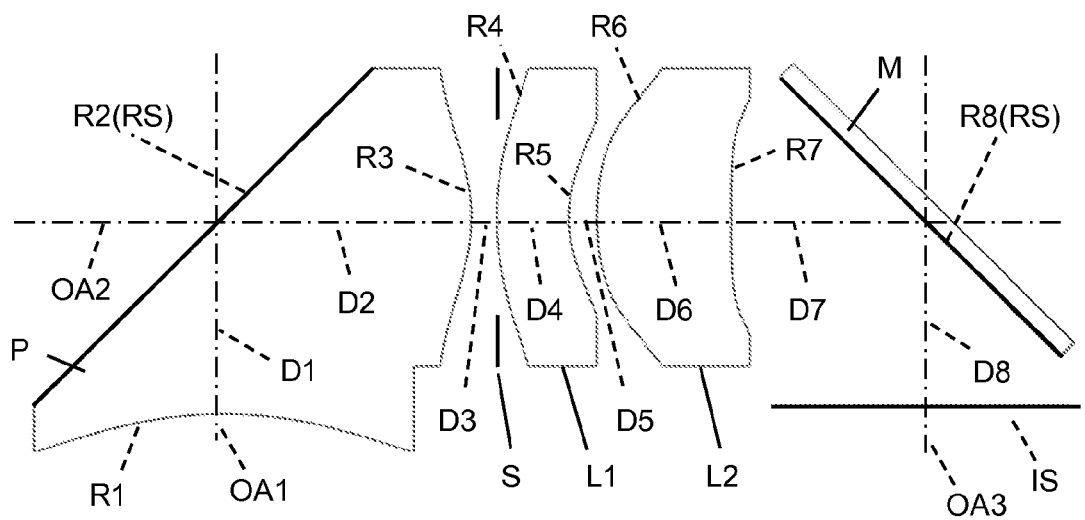
FIG. 1 shows a cross-sectional view of the compact image taking lens system with a lens-surfaced prism of the present invention according to the embodiment 1.

FIG. 1 shows a cross-sectional view of the compact image taking lens system with a lens-surfaced prism of the present invention according to the embodiment 1. Surfaces of the compact image taking lens system are numbered from the object side to the image side. The incident light comes from the object side (left bottom side) and passes along the optical axes OA1, OA2, and OA3 with reflection by the surface 2 and 8. The light from the object finally makes an image on the image surface IS.

Surfaces 1 and 3 are lens-surfaces of the lens-surfaced prism P. Surface 2 is the reflective surface of the lens-surfaced prism P. The surface 2 makes an internal reflection with change of optical axis from OA1 to OA2. The aperture stop S is located in between the lens-surfaced prism P and the first lens element L1. The first lens element L1 having surfaces 4, 5 has a meniscus shape with a convex on the object side. Focusing by the second lens element L2 having surfaces 6, 7 and the reflection by the surface 8 of the mirror M makes an image on the image surface IS. Distances D1-D8 represent on-axis surface spacing.

In the embodiment 1, the lens-surfaced prism P has aspheric surfaces 1, 3 on both sides of the lens-surfaced prism P to the object side and the image side. The reflective surface 2 (RS) in the lens-surfaced prism P makes an internal reflection from the bottom side of the system along the optical axis OA1, to the right side of the system along the optical axis OA2. Preferably, the surface 2(RS) makes total internal reflection with all fields of the ray through the lens system. Additional reflective coating can be applied to the reflecting surface 2 (RS) to enhance the reflection performance. The reflective coating can be made of metal coating or dielectric materials.

In TABLE 1, the surface properties are listed in the order of the surface number from the object side to the image side. Inside the parentheses beside the surface number #, (A) means the aspheric surface profile and (R) means the reflective surface. The surface number # with surface property, the radius of curvature R (in mm) of each surface, on-axis surface spacing D (in mm), as well as the refractive index $N_d$ and the Abbe number $v_d$. The whole lens system is normalized by the effective focal length of the lens system. Refractive index of the material is measured at the d-line of 587.6 nm and the Abbe number $v_d$ is measured by:

$$v_d = \frac{N_d - 1}{N_F - N_C} \quad \text{equation (A)}$$

where $N_d$, $N_F$, $N_C$ are the refractive index at the d-line of 587.6 nm, F-line of 586.1 nm, and C-line of 656.3 nm, respectively.

In TABLE 2, the surface coefficients of the aspheric surfaces are listed. Each aspheric surface is described by:

$$Z = \frac{CY^2}{1 + \sqrt{1 - (1+K)C^2Y^2}} + A_4 Y^4 + A_6 Y^6 + A_8 Y^8 + A_{10} Y^{10} \quad \text{equation (B)}$$

where

Z is the length (in mm) of a line draw from a point on the aspheric surface at a distance Y from the optical axis to the tangential plane of the aspheric surface vertex, C is the curvature (inverse of the radius of the curvature, R) of the aspheric lens surface, Y is the distance (in mm) from the optical axis, K is the conic coefficient of the surface, and $A_4$, $A_6$, $A_8$, and $A_{10}$ are the fourth, sixth, eighth, and tenth aspheric coefficients, respectively.

The aspheric coefficients which are not listed in the TABLE 2 are zero. An "E" in the data indicates that the number following the "E" is the exponent to the base 10. For example, "5.426E+01" represents the number $5.426 \times 10^2$.

Thanks to the configuration of the lens-surfaced prism and the mirror, the whole lens system can have small thickness (the thickness appears as height in FIG. 1). The compact image taking lens system with a lens-surfaced prism of the present invention has many advantages to make thinner and compact lens module thanks to the combined properties of the reflective geometry of the lens system and the lens-surfaced prism. The lens-surfaced prism itself performs its function as a prism and a lens at the same time.

Figure 2:
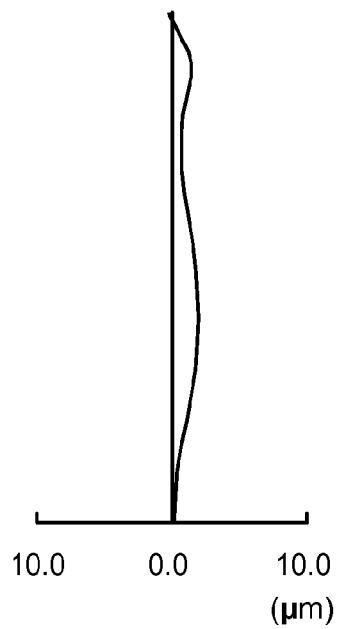
FIG. 2 shows aberration of the compact image taking lens system with a lens-surfaced prism of the present invention according to the embodiment 1.

FIG. 2 shows aberration of the compact image taking lens system with a lens-surfaced prism of the present invention according to the embodiment 1. Even though the lens system is not rotationally symmetric. The aberration is calculated from the height from the optical axis. The aberration is calculated at the E-line of 546.07 nm. The aberration is shown for an f-number of 2.8481

Figure 3:
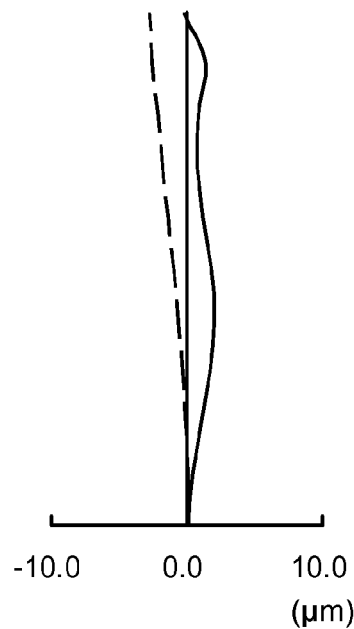
FIG. 3 shows astigmatism of the compact image taking lens system with a lens-surfaced prism of the present invention according to the embodiment 1.

FIG. 3 shows astigmatism of the compact image taking lens system with a lens-surfaced prism of the present invention according to the embodiment 1. The astigmatism for the compact image taking lens system with a lens-surfaced prism of the present invention is shown at the E-line of 546.07 nm for the sagital image surface S (in solid line) and the tangential image surface T (in dashed line).

Figure 4:
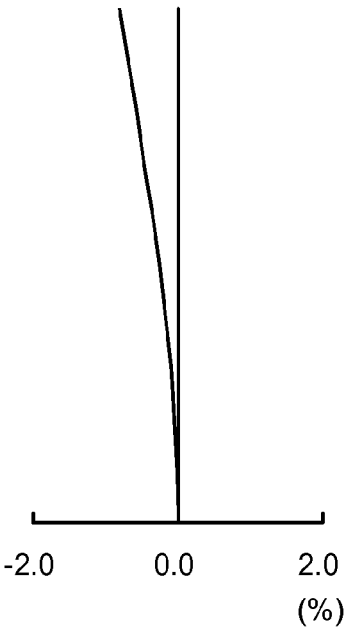
FIG. 4 shows distortion of compact image taking lens system with a lens-surfaced prism of the present invention according to the embodiment 1.

FIG. 4 shows distortion of compact image taking lens system with a lens-surfaced prism of the present invention according to the embodiment 1. The distortion for the compact image taking lens system with a lens-surfaced prism of the present invention is shown at the E-line of 546.07 nm. The half-field angle ω for FIG. 3 and FIG. 4 is 26.55°.

Figure 5:
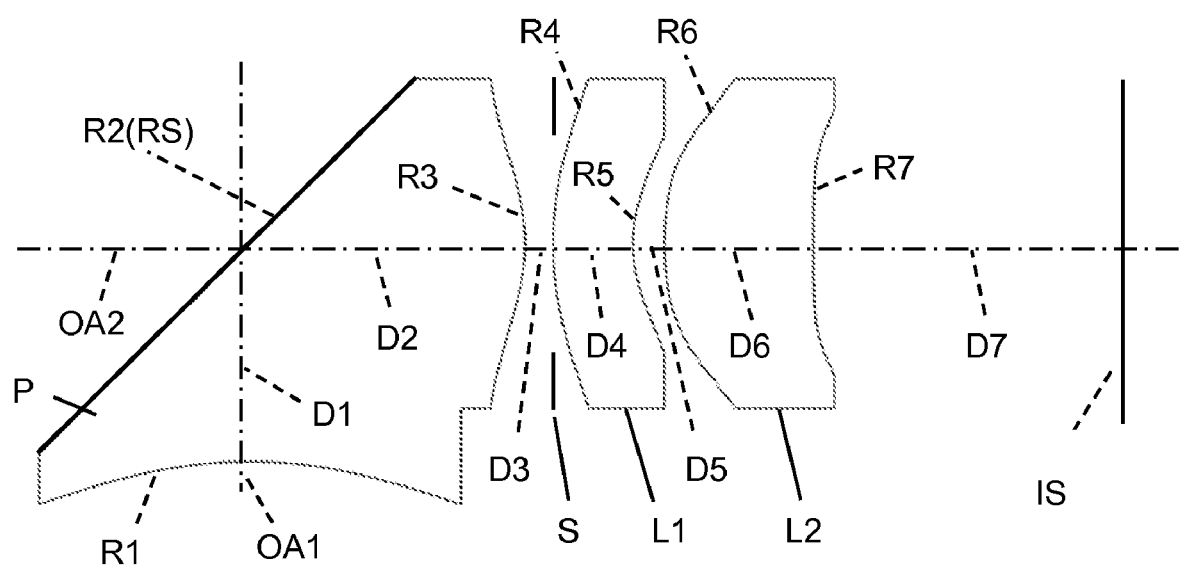
FIG. 5 shows a cross-sectional view of the compact image taking lens system with a lens-surfaced prism of the present invention according to the embodiment 2.

FIG. 5 shows a cross-sectional view of the compact image taking lens system with a lens-surfaced prism of the present invention according to the embodiment 2. Surfaces of the compact image taking lens system are numbered from the object side to the image side. The incident light comes from the object side (left bottom side) and passes through the optical axes OA1, and OA2 with reflection by the surface 2.

The light from the object finally makes an image on the image surface IS. In this configuration, the reflecting surface 8 is not present. And the image surface is placed at the focus of the lens system. All the other variables and configurations are the same as the case of the embodiment 1.

In this embodiment, the thickness is the width (from left to right in FIG. 5). The thickness of the system is now much thicker than that of the embodiment 1. As mentioned in FIG. 1, the thickness can be smaller with introducing the proper reflecting surface to the system. Proper geometry and configuration can be selected with respect to the whole application geometry.

Surfaces 1 and 3 are lens-surfaces of the lens-surfaced prism P. Surface 2 is the reflective surface of the lens-surfaced prism P. The surface 2 makes an internal reflection with change of optical axis from OA1 to OA2. The aperture stop S is located in between the lens-surfaced prism P and the first lens element L1. The first lens element L1 having surfaces 4, 5 has a meniscus shape with a convex on the object side. Focusing by the second lens element L2 having surfaces 6, 7 and the reflection by the mirror surface M makes an image on the image surface IS. Distances D1-D7 represent on-axis surface spacing.

In the embodiment 2, the lens-surfaced prism P has aspheric surfaces 1, 3 on both sides to the object side and the image side as the ease of FIG. 1. The reflective surface 2 (RS) in the lens-surfaced prism P makes an internal reflection from the bottom side of the system along the optical axis OA1, to the right side of the system along the optical axis OA2. Preferably, the surface 2(RS) makes total internal reflection with all fields of the ray through the lens system. Additional reflective coating can be applied to the reflecting surface 2(RS) to enhance the reflection performance. The reflective coating can be made of metal coating or dielectric materials.

Figure 6:
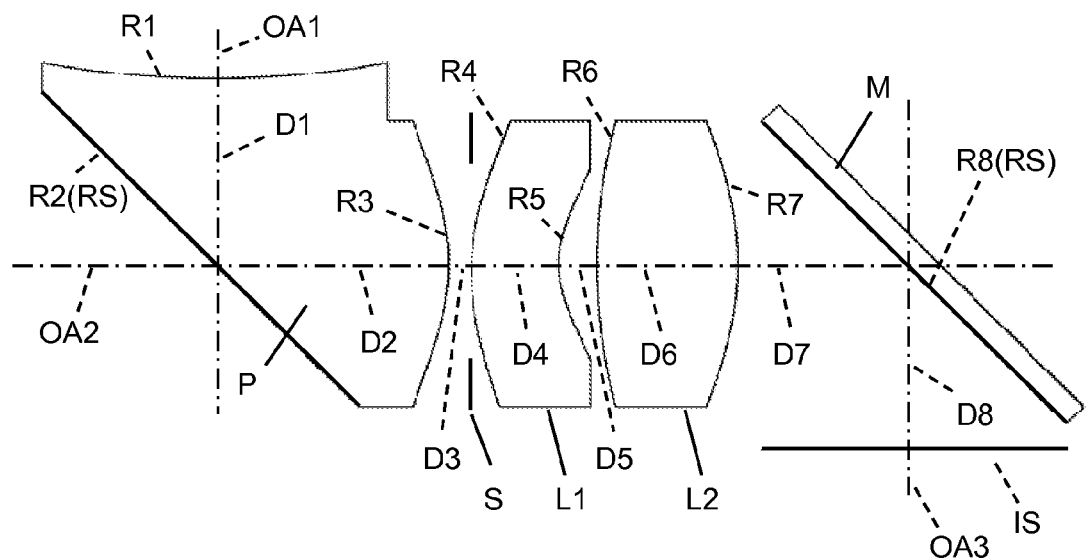
FIG. 6 shows a cross-sectional view of the compact image taking lens system with a lens-surfaced prism of the present invention according to the embodiment 3.

FIG. 6 shows a cross-sectional view of the compact image taking lens system with a lens-surfaced prism of the present invention according to the embodiment 3. Surfaces of the compact image taking lens system are numbered from the object side to the image side. The incident light comes from the object side (left top side) and passes along the optical axes OA1, OA2, and OA3 with reflection by the surface 2 and 8. The light from the object finally makes an image on the image surface IS.

1 and 3 are lens-surfaces of the lens-surfaced prism P. Surface 2 is the reflective surface of the lens-surfaced prism P. The surface 2 makes an internal reflection with change of optical axis from OA1 to OA2. The aperture stop S is located in between the lens-surfaced prism P and the first lens element L1. The first lens element L1 having surfaces 4, 5 has a meniscus shape with a convex on the object side. Focusing by the second lens element L2 having surfaces 6, 7 and the reflection by the surface 8 of the mirror M makes an image on the image surface IS. Distances D1-D8 represent on-axis surface spacing.

In the embodiment 3, the lens-surfaced prism P has conic surfaces 1, 3 on both sides of the lens-surfaced prism P to the object side and the image side. The reflective surface 2(RS) in the lens-surfaced prism P makes an internal reflection from the bottom side of the system along the optical axis OA1, to the right side of the system along the optical axis OA2. Preferably, the surface 2(RS) makes total internal reflection with all fields of the ray through the lens system. Additional reflective coating can be applied to the reflecting surface 2(RS) to enhance the reflection performance. The reflective coating can be made of metal coating or dielectric materials.

In TABLE 3, the surface properties are listed in the order of the surface number from the object side to the image side. Inside the parentheses beside the surface number #, (C) means the conic surface profile and (R) means the reflective surface. The surface number # with surface property, the radius of curvature R (in mm) of each surface, conic constants, on-axis surface spacing D (in mm), as well as the refractive index $N_d$ and the Abbe number $v_d$. The whole lens system is normalized by the effective focal length of the lens system. All the surfaces are designed as conic surfaces with only radius of the curvature and the conic constant. Refractive index of the material is measured at the d-line of 587.6 nm and the Abbe number $v_d$ is measured as equation (A).

In TABLE 2, the surface coefficient of the surface is listed. The aspheric conic surface is described by:

$$Z = \frac{CY^2}{1 + \sqrt{1 - (1+K)C^2Y^2}} \quad \text{equation (C)}$$

where

Z is the length (in mm) of a line draw from a point on the aspheric surface at a distance Y from the optical axis to the tangential plane of the aspheric surface vertex, C is the curvature (inverse of the radius of curvature, R) of the aspheric lens surface, Y is the distance (in mm) from the optical axis, K is the conic coefficient of the surface.

Thanks to the configuration of the lens-surfaced prism and the mirror, the whole lens system can have small thickness (the thickness appears as height in FIG. 6). The compact image taking lens system with a lens-surfaced prism of the present invention has many advantages to make thinner and compact lens module thanks to the combined properties of the reflective geometry of the lens system and the lens-surfaced prism. The lens-surfaced prism itself performs its function as a prism and a lens at the same time. The geometry of embodiment 3 has an advantage that the object side and the image side can be assigned in opposite sides dislike the cases of the embodiment 1 and 2. This geometry gives highly freedom of application design with layout.

Figure 7:
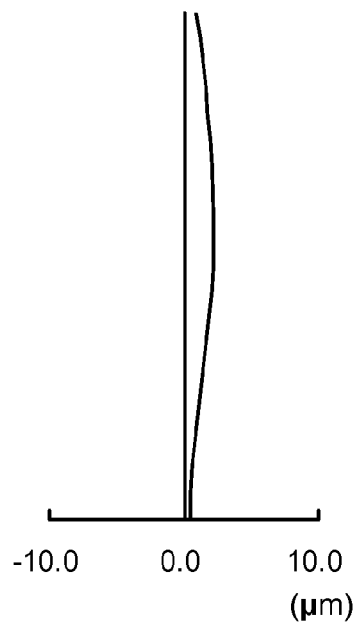
FIG. 7 shows aberration of the compact image taking lens system with a lens-surfaced prism of the present invention according to the embodiment 3.

FIG. 7 shows aberration of the compact image taking lens system with a lens-surfaced prism of the present invention according to the embodiment 1. Even though the lens system is not rotationally symmetric. The aberration is calculated from the height from the optical axis. The aberration is calculated at the E-line of 546.07 nm. The aberration is shown for an f-number of 2.8187

Figure 8:
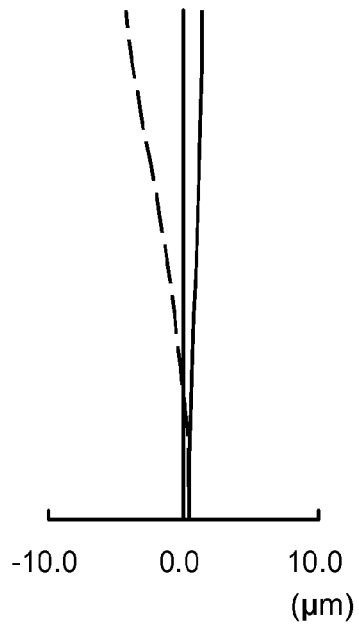
FIG. 8 shows astigmatism of the compact image taking lens system with a lens-surfaced prism of the present invention according to the embodiment 3.

FIG. 8 shows astigmatism of the compact image taking lens system with a lens-surfaced prism of the present invention according to the embodiment 3. The astigmatism for the compact image taking lens system with a lens-surfaced prism of the present invention is shown at the E-line of 546.07 nm for the sagital image surface S (in solid line) and the tangential image surface T (in dashed line).

Figure 9:
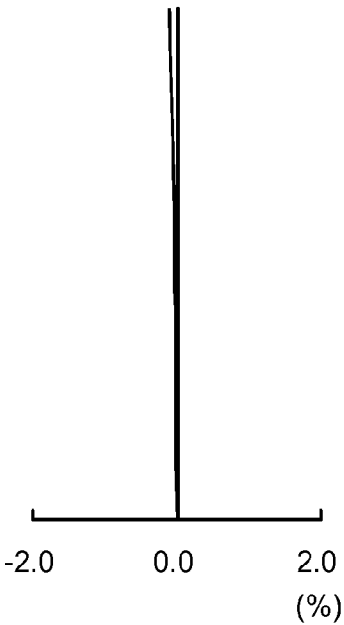
FIG. 9 shows distortion of compact image taking lens system with a lens-surfaced prism of the present invention according to the embodiment 3.

FIG. 9 shows distortion of compact image taking lens system with a lens-surfaced prism of the present invention according to the embodiment 3. The distortion for the compact image taking lens system with a lens-surfaced prism of the present invention is shown at the E-line of 546.07 nm. The half-field angle ω for FIG. 8 and FIG. 9 is 23.54°.

Figure 10:
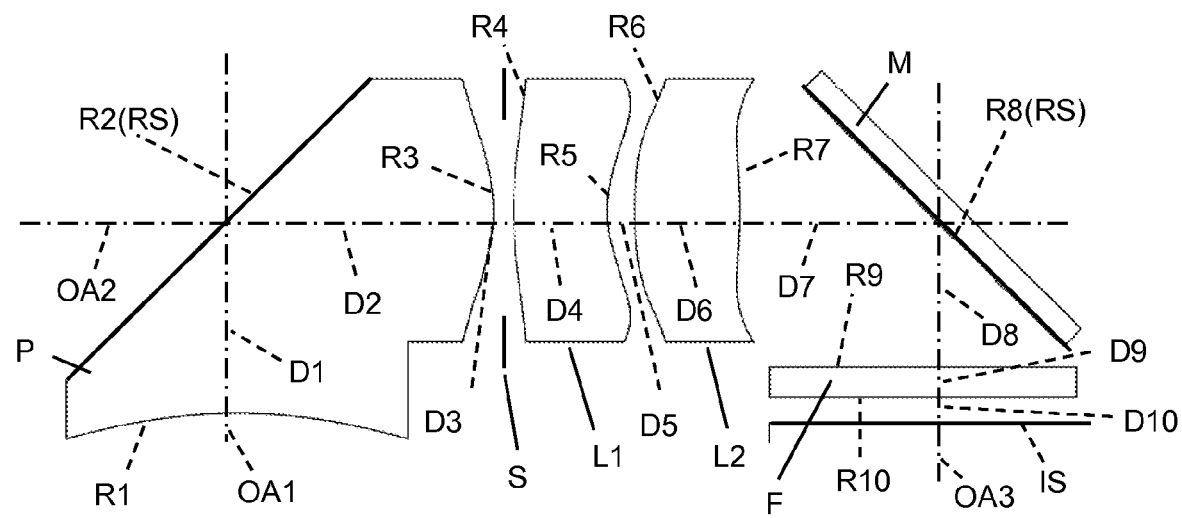
FIG. 10 shows a cross-sectional view of the compact image taking lens system with a lens-surfaced prism of the present invention according to the embodiment 4.

FIG. 10 shows a cross-sectional view of the compact image taking lens system with a lens-surfaced prism of the present invention according to the embodiment 4. Surfaces of the compact image taking lens system are numbered from the object side to the image side. The incident light comes from the object side (left bottom side) and passes through the optical axes OA1, OA2, and OA3 with reflection by the surface 2 and 8. The light from the object finally makes an image on the image surface IS after passing through the infrared cut-off filter F.

Surfaces 1 and 3 are lens-surfaces of the lens-surfaced prism P. Surface 2 is the reflective surface of the lens-surfaced prism P. The surface 2 makes an internal reflection with change of optical axis from OA1 to OA2. The aperture stop S is located in between the lens-surfaced prism P and the first lens element L1. The first lens element L1 having surfaces 4, 5 has a meniscus shape with a convex on the object side. Focusing by the second lens element L2 having surfaces 6, 7 and the reflection by the surface 8 of the mirror M makes an image on the image surface IS. Distances D1-D10 represent on-axis surface spacing.

In the embodiment 4, the lens-surfaced prism P has aspheric surfaces 1, 3 on both sides of the lens-surfaced prism P to the object side and the image side. The reflective surface 2(RS) in the lens-surfaced prism P makes an internal reflection from the bottom side of the system along the optical axis OA1, to the right side of the system along the optical axis OA2. Preferably, the surface 2(RS) makes total internal reflection with all fields of the ray through the lens system. Additional reflective coating can be applied to the reflecting surface 2(RS) to enhance the reflection performance. The reflective coating can be made of metal coating or dielectric materials.

In TABLE 4, the surface properties are listed in the order of the surface number from the object side to the image side. Inside the parentheses beside the surface number #, (A) means the aspheric surface profile and (R) means the reflective surface. The surface number # with surface property, the radius of curvature R (in mm) of each surface, on-axis surface spacing D (in mm), as well as the refractive index $N_d$ and the Abbe number $v_d$. The whole lens system is normalized by the effective focal length of the lens system. Refractive index of the material is measured at the d-line of 587.6 nm and the Abbe number $v_d$ is measured according to the equation (A).

In TABLE 5, the surface coefficients of the aspheric surface are listed. The aspheric surface is described by equation (B). The aspheric coefficients which are not listed in the TABLE 5 are zero. An "E" in the data indicates that the number following the "E" is the exponent to the base 10.

Thanks to the configuration of the lens-surfaced prism and the mirror, the whole lens system can have small thickness (the thickness appears as height in FIG. 10). The compact image taking lens system with a lens-surfaced prism of the present invention has many advantages to make thinner and compact lens module thanks to the combined properties of the reflective geometry of the lens system and the lens-surfaced prism. The lens-surfaced prism itself performs its function as a prism and a lens at the same time.

Figure 11:
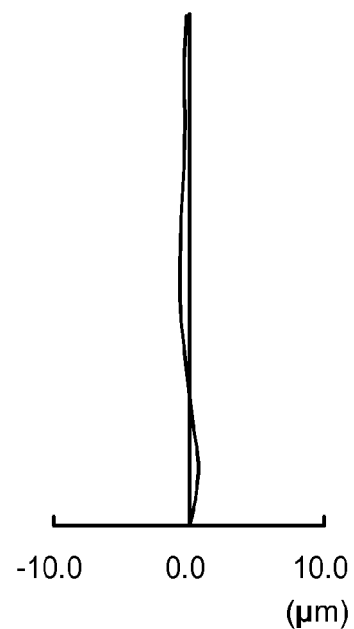
FIG. 11 shows aberration of the compact image taking lens system with a lens-surfaced prism of the present invention according to the embodiment 4.

FIG. 11 shows aberration of the compact image taking lens system with a lens-surfaced prism of the present invention according to the embodiment 4. Even though the lens system is not rotationally symmetric. The aberration is calculated from the height from the optical axis. The aberration is calculated at the E-line of 546.07 nm. The aberration is shown for an f-number of 2.7746

Figure 12:
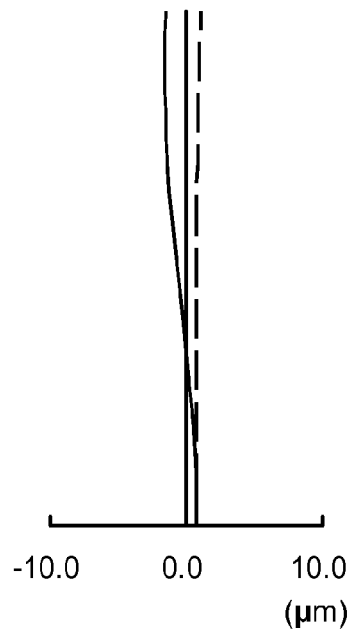
FIG. 12 shows astigmatism of the compact image taking lens system with a lens-surfaced prism of the present invention according to the embodiment 4.

FIG. 12 shows astigmatism of the compact image taking lens system with a lens-surfaced prism of the present invention according to the embodiment 4. The astigmatism for the compact image taking lens system with a lens-surfaced prism of the present invention is shown at the E-line of 546.07 nm for the sagital image surface S (in solid line) and the tangential image surface T (in dashed line).

Figure 13:
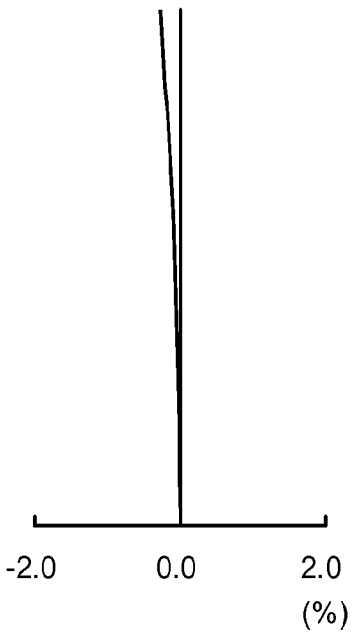
FIG. 13 shows distortion of compact image taking lens system with a lens-surfaced prism of the present invention according to the embodiment 4.

FIG. 13 shows distortion of compact image taking lens system with a lens-surfaced prism of the present invention according to the embodiment 4. The distortion for the compact image taking lens system with a lens-surfaced prism of the present invention is shown at the E-line of 546.07 nm. The half-field angle ω for FIG. 12 and FIG. 13 is 26.71°.

While the invention has been shown and described with reference to different embodiments thereof, it will be appre ciated by those skills in the art that variations in form, detail, compositions and operation may be made without departing from the spirit and scope of the present invention as defined by the accompanying claims.

TABLE 1

| surface # | R | D | $N_d$ | $v_d$ |
|---|---|---|---|---|
| 1 (A) | −0.92820 | 0.44446 | 1.52713 | 55.74 |
| 2 (R) | ∞ | −0.55558 | 1.52713 | 55.74 |
| 3 (A) | 0.39091 | −0.05559 | | |
| 4 (A) | −0.64784 | −0.16223 | 1.63200 | 23.41 |
| 5 (A) | −0.27917 | −0.06309 | | |
| 6 (A) | −0.66642 | −0.30001 | 1.52713 | 55.74 |
| 7 (A) | −33.98913 | −0.42224 | | |
| 8 | ∞ | 0.42541 | | |

TABLE 2

| surface # | R | K | $A_4$ | $A_6$ | $A_8$ | $A_{10}$ |
|---|---|---|---|---|---|---|
| 1 | −0.92820 | −0.20636 | 0.16956 | 1.363E+00 | −3.340E+00 | 4.976E+00 |
| 3 | 0.39091 | −0.30058 | −8.63977 | 5.426E+01 | −3.693E+02 | 9.995E+02 |
| 4 | −0.64784 | 0.81654 | 3.20934 | −7.775E+01 | 1.293E+03 | −7.593E+03 |
| 5 | −0.27917 | −0.49488 | 17.56064 | −5.078E+02 | 9.303E+03 | −5.967E+04 |
| 6 | −0.27917 | −0.49488 | 17.56064 | −5.078E+02 | 9.303E+03 | −5.967E+04 |
| 7 | −33.98913 | 0.00000 | −6.06996 | −4.485E+01 | 1.545E+02 | −5.544E+03 |

TABLE 3

| surface # | R | K | D | $N_d$ | $v_d$ |
|---|---|---|---|---|---|
| 1 (C) | −1.93102 | 2.31123 | 0.39020 | 1.53199 | 66.09 |
| 2 (R) | ∞ | | 0.48775 | 1.53199 | 66.09 |
| 3 (C) | 0.42744 | −4.53878 | 0.04762 | | |
| 4 (C) | −0.49031 | −4.21298 | 0.18171 | 1.73534 | 28.43 |
| 5 (C) | −0.21264 | −2.48441 | 0.08061 | | |
| 6 (C) | −1.14783 | −1.19719 | 0.29265 | 1.52580 | 66.62 |
| 7 (C) | 0.63617 | −2.10327 | 0.35118 | | |
| 8 | ∞ | | 0.39020 | | |

TABLE 4

| surface # | R | D | $N_d$ | $v_d$ |
|---|---|---|---|---|
| 1 (A) | −0.27443 | 0.22987 | 1.52996 | 55.84 |
| 2 (R) | ∞ | 0.48775 | 1.53199 | 66.09 |
| 3 (A) | −0.08701 | 0.01022 | | |
| 4 (A) | 0.19895 | 0.04700 | 1.61420 | 25.59 |
| 5 (A) | 0.06440 | 0.01357 | | |
| 6 (A) | 0.23797 | 0.05211 | 1.52996 | 55.84 |
| 7 (A) | −0.27250 | 0.09195 | | |
| 8 (R) | ∞ | 0.07885 | | |
| 9 (F) | ∞ | 0.01532 | 1.51680 | 64.17 |
| 10 | ∞ | 0.01277 | | |

TABLE 5

| surface # | R | K | $A_4$ | $A_6$ | $A_8$ | $A_{10}$ |
|---|---|---|---|---|---|---|
| 1 | −0.27443 | 2.19553 | 1.896E+01 | 7.697E+02 | 2.378E+03 | 4.113E+05 |
| 3 | −0.08701 | −0.39939 | 6.640E+02 | −8.562E+04 | 1.127E+07 | −6.357E+08 |
| 4 | 0.19895 | 0.10050 | −2.898E+02 | 6.348E+04 | −2.709E+07 | 3.426E+09 |
| 5 | 0.06440 | −0.80312 | −1.686E+03 | 6.808E+05 | −2.394E+08 | 3.082E+10 |
| 6 | 0.23797 | 8.82393 | 3.041E+02 | 2.941E+05 | −1.119E+08 | 8.679E+09 |
| 7 | −0.27250 | −0.87898 | 5.447E+02 | 1.124E+04 | 4.567E+07 | −8.189E+09 |

The invention claimed is:

1. A compact image taking lens system with a lens-surfaced prism comprising from an object side to an image side:
   a) a prism having a concave surface on the abject side, an internal reflective surface, and a surface on the image side;
   b) an aperture stop;
   c) a first lens element having a negative optical refractive power, wherein the first lens element has both side aspheric surfaces on the object side and on the image side;
   d) a second lens element having a positive optical refractive power; and
   e) an image surface, wherein the image taking lens system makes image on the image surface.

2. The compact image taking lens system with a lens-surfaced prism of claim 1, wherein the prism is made of plastic with at least one aspheric surface on the object side and the image side.

3. The compact image taking lens system with a lens-surfaced prism of claim 1, wherein the prism is made of glass with at least one aspheric surface on the object side and the image side.

4. The compact image taking lens system with a lens-surfaced prism of claim 1, wherein the internal reflective surface of the prism makes total internal reflection, wherein the optical index of the prism is larger than 1.5.

5. The compact image taking lens system with a lens-surfaced prism of claim 1, wherein the internal reflective surface of the prism is a reflective surface made of internal reflective coating.

6. The compact image taking lens system with a lens-surfaced prism of claim 5, wherein the internal reflective coating of the prism is made of metal.

7. The compact image taking lens system with a lens-surfaced prism of claim 5, wherein the internal reflective coating of the prism is made of dielectric materials.

8. The compact image taking lens system with a lens-surfaced prism of claim 1, wherein the first lens element is made of plastic with Abbe number less than 35.0.

9. The compact image taking lens system with a lens-surfaced prism of claim 1, wherein the first lens element has at least one aspheric surface on the object side and on the image side.

10. The compact image taking tens system with a lens-surfaced prism of claim 1, wherein the first lens element has a meniscus shape with a convex surface on the object side.

11. The compact image taking lens system with a lens-surfaced prism of claim 1, wherein the second lens element has at least one aspheric surface on the object side and on the image side.

12. The compact image taking lens system with a lens-surfaced prism of claim 1, wherein the second lens element has a meniscus shape with a convex surface on the object side.

13. The compact image taking lens system with a lens-surfaced prism of claim 1, wherein the second lens element has both side aspheric surfaces on the object side and on the image side.

14. The compact image taking lens system with a lens-surfaced prism of claim 1, wherein the second lens element is made of glass with Abbe number larger than 45.0.

15. The compact image taking lens system with a lens-surfaced prism of claim 1, wherein the second lens element is made of plastic with Abbe number larger than 45.0.

16. The compact image taking lens system with a lens-surfaced prism of claim 1, further comprising a reflecting surface between the second lens element and the image surface to reflect incident light to the image surface for reducing thickness of the image taking lens system.

17. The compact image taking lens system with a lens-surfaced prism of claim 1, further comprising an infrared cut-off filter between the second lens element and the image surface.

18. A compact image taking lens system with a lens-surfaced prism comprising from an object side to an image side:
   a) a prism having a concave surface on the object side, an internal reflective surface, and a surface on the image side, wherein both sides of the object side and the image sides are aspheric;
   b) an aperture stop;
   c) a first lens element, wherein the first lens element is a negative optical refractive power meniscus shape lens with a convex on the object side, wherein the first lens element is made of plastic with at least one aspheric surface on the object side surface and the image side surface;
   d) a second lens element having a positive optical refractive power;
   e) a reflective surface to reduce thickness of the compact image taking lens system; and
   f) an image surface, wherein the image taking lens system makes image on the image surface.

19. The compact image taking lens system with a lens-surfaced prism of claim 18, wherein the prism is made of glass.

20. The compact image taking lens system with a lens-surfaced prism of claim 18, wherein the first lens element has both side aspheric surfaces on the object side surface and on the image side surface.

21. The compact image taking lens system with a lens-surfaced prism of claim 18, wherein the second lens element has at least one aspheric surface on the object side and on the image side surface with a convex on the object side surface.

22. The compact image taking lens system with a lens-surfaced prism of claim 18, wherein the second lens element has a meniscus shape with a convex on the object side.

23. The compact image taking lens system with a lens-surfaced prism of claim 18, further comprising an infrared cut-off filter between the second lens element and the image surface.

24. A compact image taking lens system with a lens-surfaced prism comprising from an object side to an image side:
   a) a prism having a concave surface on the object side, an internal reflective surface, and a concave surface on the image side;
   b) an aperture stop;
   c) a first lens element, wherein the first lens element is a negative optical refractive power meniscus shape lens with a convex on the object side, wherein the first lens element is made of plastic with at least one aspheric surface on the object side surface and the image side surface;
   d) a second lens element having a positive optical refractive power with a convex on the object side, wherein the second lens element is made of plastic with Abbe number larger than 45.0;
   e) a reflective surface to reduce thickness of the compact image taking lens system; and
   f) an image surface, wherein the image taking lens system makes image on the image surface.

25. The compact image taking lens system with a lens-surfaced prism of claim 24, wherein the prism is made of glass with both side aspheric surfaces on the object side and the image side.

26. The compact image taking lens system with a lens-surfaced prism of claim 24, wherein the second lens element has at least one aspheric surface on the object side and on the image side surface with a convex on the object side surface.

27. The compact image taking lens system with a lens-surfaced prism of claim 24, wherein the second lens element bas a meniscus shape with a convex on the object side.

28. The compact image taking lens system with a lens-surfaced prism of claim 24, further comprising an infrared cut-off filter between the second lens element and the image surface.

* * * * *